(12) United States Patent
Firestone et al.

(10) Patent No.: US 8,659,636 B2
(45) Date of Patent: *Feb. 25, 2014

(54) SYSTEM AND METHOD FOR PERFORMING DISTRIBUTED VIDEO CONFERENCING

(75) Inventors: Scott S. Firestone, Mountain View, CA (US); Walter R. Friedrich, Pleasanton, CA (US); Nermin M. Ismail, Mountain View, CA (US); Keith A. Lantz, Los Altos, CA (US); Shantanu Sarkar, San Jose, CA (US); Luke K. Surazski, Santa Clara, CA (US); Duanpei Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/680,918

(22) Filed: Oct. 8, 2003

(65) Prior Publication Data

US 2005/0078170 A1   Apr. 14, 2005

(51) Int. Cl.
*H04N 7/14* (2006.01)
(52) U.S. Cl.
CPC ...................................... *H04N 7/14* (2013.01)
USPC ................... 348/14.08; 348/14.09; 348/14.13
(58) Field of Classification Search
USPC .................... 348/14.01–14.16; 709/204, 217; 370/260–261; 379/202.01
See application file for complete search history.

(56) References Cited

U.S. PATENT DOCUMENTS

| | | | |
|---|---|---|---|
| 5,007,046 A | 4/1991 | Erving et al. ................. | 370/32.1 |
| 5,058,153 A | 10/1991 | Carew et al. ................... | 379/390 |
| 5,844,600 A * | 12/1998 | Kerr ............................ | 348/14.12 |
| 5,848,098 A | 12/1998 | Cheng et al. ................... | 375/220 |
| 5,936,662 A * | 8/1999 | Kim et al. ..................... | 348/14.09 |
| 6,078,809 A | 6/2000 | Proctor .......................... | 455/416 |
| 6,128,649 A * | 10/2000 | Smith et al. ..................... | 709/217 |
| 6,148,068 A | 11/2000 | Lowery et al. ................. | 379/202 |
| 6,300,973 B1 * | 10/2001 | Feder et al. ................. | 348/14.09 |
| 6,535,604 B1 | 3/2003 | Provencal et al. ........ | 379/388.06 |
| 6,590,604 B1 * | 7/2003 | Tucker et al. ............. | 348/14.13 |
| 2004/0008635 A1 * | 1/2004 | Nelson et al. ................. | 370/260 |
| 2004/0170159 A1 * | 9/2004 | Kim et al. ...................... | 370/352 |
| 2005/0062843 A1 * | 3/2005 | Bowers et al. ............. | 348/14.08 |

FOREIGN PATENT DOCUMENTS

WO    WO 03/065720 A1    7/2003

OTHER PUBLICATIONS

Australian Government letter to Pizzeys, Examiner's First Report on Patent Application No. 2004306740, 2 pages.
State IP Office of the People's Republic of China; Text of the First Office Action; Application No. 200480026120.3; 4 pages.

(Continued)

*Primary Examiner* — Melur Ramakrishnaiah
(74) *Attorney, Agent, or Firm* — Baker Botts L.L.P.

(57) ABSTRACT

A method for executing a video conference is provided that includes receiving one or more audio streams associated with a video conference from one or more end points and determining an active speaker associated with one of the end points. Audio information associated with the active speaker may be received at one or more media switches. One or more video streams may be suppressed except for a selected video stream associated with the active speaker, the selected video stream propagating to one or more of the media switches during the video conference. The selected video stream may be replicated such that it may be communicated to one or more of the end points associated with a selected one of the media switches.

34 Claims, 4 Drawing Sheets

(56) References Cited

OTHER PUBLICATIONS

The Second Office Action, The Patent Office of the People's Republic of China, Application No. 200480026120.3, 7 pages (only first 2 pages translated), Dec. 11, 2009.
EPO Communication, Reference No. P28668EP-PCT/IK, Appln. No./Patent No. 04794355.0-1241 / 1678951 PCT/US2004032977, 3 pages, Feb. 10, 2012.
EPO Invitation pursuant to Rule 62a(1) EPC, Application No. 04 794 355.0-1241, Ref. P28668EP-PCT/IK, 2 pages, date stamped Aug. 19, 2011, Aug. 16, 2011.
The Patent Office of the People's Republic of China, Application No. 200480026120.3, Serial No. 2011050300560260, The Third Office Action, in Chinese with English Translation, 8 pages, May 6, 2011.
EPO Communication Pursuant to Article 94(3) EPC; Ref. P28668EP-PCT/IK; Application No. 04 794 355.0-1241, Apr. 17, 2012.

* cited by examiner

SYSTEM AND METHOD FOR PERFORMING DISTRIBUTED VIDEO CONFERENCING

TECHNICAL FIELD OF THE INVENTION

This invention relates in general to the field of communications and, more particularly, to a system and method for performing distributed video conferencing.

BACKGROUND OF THE INVENTION

Networking architectures and the field of video conferencing have grown increasingly complex in communications environments. In addition, the augmentation of clients or end users wishing to communicate in such environments has caused many networking configurations and systems to respond by adding elements to accommodate the increase in networking traffic. Communication tunnels or links may be used in order to establish a communication flow, whereby an end user or an object may initiate a video or an audio session to facilitate a particular call or conference. Selected locations within the communication architecture may be accessed or designated to conduct the communication session. The selected location or network point may then provide a platform that the end user may use to execute a communication session.

The traditional approach to video conferencing is to use a centralized multipoint control unit (MCU). This sets up media streams from the end points to a conference server where the streams may be mixed and then sent back to the end points as individual streams. The mixing may include composition (for example), creating a two-by-two composition of four video streams. Each of these sub-streams can be locked to a particular user or voice-switched where appropriate. Other possible compositions can be one-by-one, one-by-two, three-by-three, etc. It is critical that timing and synchronization be precise in such video-conferencing scenarios. Additionally, bandwidth considerations should be recognized and appreciated in attempting to accommodate optimal video conferences. Accordingly, the ability to provide an effective mechanism to properly direct communications for an end user/end point, or to offer an appropriate protocol that optimizes bandwidth characteristics and parameters provides a significant challenge to network operators, component manufacturers, and system designers.

SUMMARY OF THE INVENTION

From the foregoing, it may be appreciated by those skilled in the art that a need has arisen for an improved communications approach that provides for more appropriate data-routing procedures to achieve optimal data management in a video conferencing environment. In accordance with one embodiment of the present invention, a system and a method for performing distributed video conferencing may be provided that greatly reduce disadvantages and problems associated with conventional information distribution techniques.

Note that for purposes of clarity and discussion, it may be beneficial to understand some of the components provided in the present conferencing architecture. In general, a network core and a network edge may be provided. One or more end points may attach to a distributed multipoint control unit (MCU) via a media switch. The media switch may provide an interface from the edge of the network to the core of the network. In the core, the media distribution can be optimized, whereby such optimizations can be transparent to the end points. The core distribution may be switched or fixed.

According to an embodiment of the present invention, there is provided a method for executing a video conference that includes receiving one or more audio streams associated with a video conference from one or more end points and determining an active speaker associated with one of the end points. Audio information associated with the active speaker may be received at one or more media switches. All video streams may be suppressed except for a selected video stream associated with the active speaker, the selected video stream propagating to one or more of the media switches during the video conference. The selected video stream may be replicated such that it may be communicated to one or more of the end points associated with a selected one of the media switches.

Certain embodiments of the present invention may provide a number of technical advantages. For example, according to one embodiment of the present invention, a video conferencing architecture is provided that allows for a host of features and services to be provided to participants during a video conference. For example, end points can choose to lock-on to a particular participant of the conference at any appropriate time. End points that are locked-on may stream a fixed video (FV) stream to the conference. In cases where multiple end points desire to lock-on to the same participant, they can subscribe to the same stream, or signaling can be exchanged between media switches to set up appropriate unicast streams. Thus, each end point can receive a mixture of FV and switched video (SV) streams. Alternatively, an end point can choose not to receive any SV streams at all and just receive the FV stream for a particular participant. In still other scenarios, the SV stream received by an end point is not switched based on the active audio speaker, but based on other criteria, such as the person controlling a shared whiteboard. The moderator is also given the capability of choosing to switch the video source at appropriate times. In other embodiments, a host of media services may be provided to participants of the video conference (e.g. via a media bridge).

Another advantage associated with one embodiment of the present invention relates to the architecture's ability to allow for more economical video conferencing configurations. The architecture of the present invention provides audio/video synchronization of videoconferences when the audio bridge and video bridge are not necessarily co-located on the same given network device. Affordable desktop video conferencing, as provided by the present architecture, would offer a viable solution to many seeking to execute optimal conferencing scenarios. Additionally, such affordability could lead to the proliferation of video conferencing, thereby making such a technology ubiquitous and widely accepted.

Yet another advantage associated with one embodiment of the present invention relates to its flexibility. The present architecture may allow the network infrastructure already in place to be leveraged, instead of using point products or other devices to effectuate video conferencing operations. Additionally, each user can have a customized view of the conference by choosing a different subset of FV and SV streams. Moreover, legacy end points may be readily supported with such a configuration, while allowing enhanced end points to provide additional services. In still other scenarios, legacy multipoint control units (MCUs) may be supported for composition, thus preserving any initial equipment investment. In other scenarios, such an implementation is codec-agnostic. Therefore, in the context of new codecs such as H.264, these codecs can be deployed without requiring upgrades to the entire network infrastructure. Bandwidth usage may also be minimized by suppressing streams and using multicast. Such an embodiment could systematically enable large desktop video conferences. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1A:
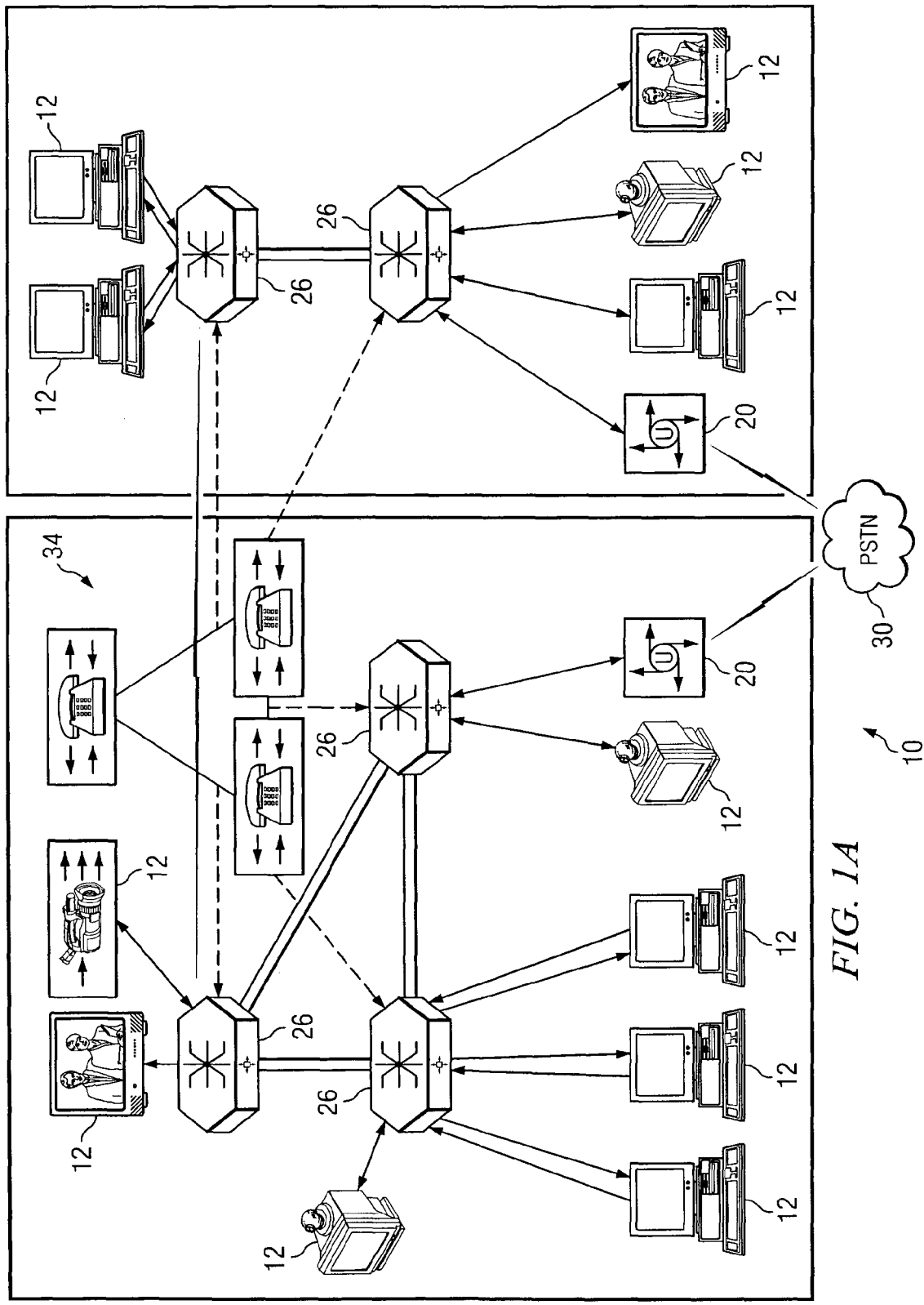
FIG. 1A is a simplified block diagram of a communication system for performing distributed video conferencing in accordance with one embodiment of the present invention.

FIG. 1A is a simplified block diagram of a communication system 10 for communicating data in a network environment. Communication system 10 includes multiple end points 12 that are illustrated in FIG. 1A as representative of various devices and components (e.g. audio internet protocol (IP) phones, video phone appliances, personal computer (PC) based video phones, and streaming clients). Communication system 10 may also include a plurality of gateways 20 that provide connectivity to each other via a public switched telephone network (PSTN) 30. Communication system 10 may also include a plurality of media switches 26 (which may be abbreviated as MS or MSs herein in this document) that may be coupled to each other, gateways 20, and various end points 12. Additionally, communication system 10 may include a set of call agents 34 (e.g. a centralized call manager) that may be coupled to media switches 26. In addition, communication system 10 may include any number of suitable applications (e.g. conference manager (CM), video conferencing scheduler, user conference control, directory services, network management tools), etc.

A video conference, in the context of communication system 10, may be defined as a set of video streams. These streams may be classified as fixed video (FV) and switched video (SV) streams. An FV stream originates from the same source for the duration of the conference; an SV stream can originate from different sources during the same conference. The switching of the source from one given end point to another may be controlled by one of several criteria (e.g. the active audio speaker, the person controlling a shared whiteboard, the moderator's choice etc.). Each end point 12, which is part of the conference, may receive a subset of all the streams in the conference. The particular subset received by an end point provides the user with an experience of the conference for that end point and can be different for different end points.

FIG. 1A may be generally configured or arranged to be deployed with different call control protocol architectures, fitting in either a centralized initiation protocol (SIP) architecture (e.g. a centralized call processing scenario) or a distributed architecture. The configuration changes implied by this architecture may affect the application, call control, and media layers in accordance with particular embodiments of the present invention.

In accordance with the teachings of the present invention, communication system 10 provides a platform that allows for the ability to effectively distribute video conferencing data. End points 12 may be given the opportunity to choose the subset of fixed and switched streams that define their user experience. Streams can be switched based on a variety of factors, including active audio speakers, optimizing bandwidth usage, and other pertinent parameters, which may be based on particular user or configuration needs. The network infrastructure may be used to implement conferencing, streaming, or video-on-demand.

Conferences can be created on the fly to use any available MCU, rather than specific MCUs. Communication system 10 may dispense with the notion of reliance on a central MCU and, further, may distribute the video processing functionality throughout the network. Communication system 10 may also optimize bandwidth usage and provide for a degree of customization that is not possible with a centralized MCU approach.

Communication system 10 offers a communications approach that allows for more economical video conferencing configurations. Communication system 10 provides audio/video synchronization of videoconferences when the audio bridge and video bridge are not required to be co-located on the same network device. Note that the video bridge is not necessarily required in every scenario (e.g. voice activated conferences). Affordable desktop video conferencing, as provided by the present architecture, offers a viable solution to any entity seeking to execute optimal conferencing. Additionally, such affordability could lead to the proliferation of video conferencing and, thereby, make such a technology ubiquitous and widely accepted.

Communication system 10 also provides a flexible architecture. The present architecture may allow the network infrastructure already in place to be leveraged instead of using point products. Additionally, each user can have a customized view of the conference by choosing a different subset of FV and SV streams. Moreover, legacy end points may be readily supported with such a configuration, while allowing enhanced end points to provide additional services. In other scenarios, MCUs may be supported for composition, thus preserving any initial equipment investment. In still other scenarios, such an implementation is codec-agnostic. Thus, in the context of new codecs, such as H.264, these codecs can be deployed without requiring upgrades to the entire network infrastructure. Bandwidth usage may also be minimized by suppressing streams and using multicast. Such an embodiment would systematically enable large desktop video conferences.

In operation of an example implementation involving the media layer, end point audio and video streams may be transmitted between end points 12 and their associated media switch 26. Audio and video streams may be routed independently in the core of the network, with the audio streams relying on a central speaker selection function which has access to all audio streams within a single conference. The video streams follow an optimized routing path between MSs, with video processing (i.e. transrating and transcoding) inserted as necessary under control of a conferencing management application. This architecture allows for both network and end point-based video processing. The use of a centralized audio speaker selection scheme permits the architecture to allow the video routing and switching to be optimized, resulting in significant bandwidth optimizations because of the larger amount of bandwidth typically required by 'good' quality video streams. The audio speaker selection mechanism is centralized; this does not mean that the audio mixing needs to be completely centralized, even though this may represent the most common deployment due to its reduced delays as well as to serve legacy audio devices that rely on a central mixer.

In accordance with a first embodiment of communication system 10, a voice-activated conference with centralized audio is achieved. In this embodiment, the audio streams from all end points 12 (both audio-only and video-capable) may be sent to a central audio mixer, where the active speaker is determined. This information is then propagated to all media switches 26. Media switches 26 may suppress all video streams except for the active speaker, and the video stream for the active speaker is propagated to all the MSs in the conference using SSM (Source Specific Multicast). Each media switch 26 replicates the video stream for all its local end points, which may be part of the conference. Alternatively, multicast can be used between media switch 26 and its local end points. Audio mixing can be centralized or distributed; the architecture does not require centralized audio.

Note that communication system 10 does not necessarily suppress the audio streams: it suppresses video streams. Also, suppression may be done at media switch 26 and, hence, end points 12 do not need to change or be modified to accommodate such an operation. Additionally, the active speaker can be an audio-only end point in which case the last video stream continues to be propagated. Moreover, the active speakers may receive the video stream corresponding to the last video speaker.

In accordance with a second embodiment of communication system 10, end points 12 can choose to lock-on to a particular participant of the conference. This capability may be provided through a separate interface or it may be part of the end point functionality at enhanced end points. Also, not all end points 12 may have the ability to lock-on due to bandwidth and other constraints. End points 12 that may be locked-on may stream an FV stream to the conference. Note that the FV-SV stream distinction, as well as the SSM used to propagate this stream, is not visible to the end point itself. This functionality could be implemented in media switch 26. Where multiple end points desire to lock-on to the same participant, they can subscribe to the same SSM stream, or signaling can be exchanged between media switches 26 to set up appropriate unicast streams. Thus, each end point 12 can receive a mixture of FV and SV streams. An end point can choose not to receive any SV streams at all and just receive the FV stream for a particular participant (e.g. a lecture mode with a question and answer session, where an end point may choose to receive only the keynote speaker and hear the audio for the questions). A video composite FV stream represents a case where a video end point may elect not to receive any SV streams.

In accordance with a third embodiment of communication system 10, the SV stream received by an end point is not switched based on the active audio speaker, but based on other criteria, such as the person controlling the shared whiteboard. Alternatively, the moderator may choose to switch the video source at appropriate times. There may be multiple SV streams in a single conference and they can use different criteria for switching the source. An end point can choose to receive one, multiple, or none of the SV streams in the conference.

In accordance with a fourth embodiment of communication system 10, media transformers (e.g. transcoders, transraters, and composition services) may be included in conferences to provide the relevant media services. These can be used as a media bridge, for example. A conference supporting multiple speeds/formats could be supported. The same conference can have a 128K version and a 384K version, which may be separate sub-conferences. The transrater may be included in both sub-conferences and transrate the output of one conference into the other. This would work for a SV conference, but an FV stream would utilize its own transrater. Thus, the method in which media transformers may be used in this architecture may depend on the specific needs of the transformation and multiple methods can be used simultaneously. Other media transformers could include internet protocol (IP)/television (TV) broadcast servers, for broadcasting conference, and similar services. Legacy MCUs (e.g. a Radvision MCU) could be used as a composition server in such an architecture to provide composition services.

End points 12 each represent an end user, a client, or a customer wishing to initiate a communication or participate in a video conferencing session in communication system 10. End points 12 may be inclusive of devices used to initiate (or participate in) a communication, such as a computer, a personal digital assistant (PDA), a laptop or an electronic notebook, a telephone, a mobile station, an audio IP phone, a video phone appliance, a personal computer (PC) based video phone, a streaming client, or any other device, component, element, or object capable of initiating voice, video, or data exchanges within communication system 10. End points 12 may also be inclusive of a suitable interface to the human user, such as a microphone, a display, a keyboard, a whiteboard, a video-conferencing interface or bridge, or other terminal equipment. End points 12 may also be any device that seeks to initiate (or participate in) a communication on behalf of another entity or element, such as a program, a database, an application, a piece of software, or any other component, device, element, or object capable of initiating a voice, a video, or a data exchange within communication system 10. Data, as used herein in this document, refers to any type of numeric, voice and audio, video, audio-visual, or script data, or any type of source or object code, or any other suitable information in any appropriate format that may be communicated from one point to another.

As identified supra, a wide range of end points may be supported in the architecture of communication system 10. Legacy audio devices can be mixed with legacy (or new video) capable end points. Legacy end points can be connected in a manner such that its service requirements may be met. For end points needing a voice activated service, intelligent media switching may be utilized unless there may be bandwidth constraints demanding a video transrater to be inserted in the media path or a video transcoder due to codec incompatibilities. For legacy end points facilitating multiple concurrent video images, an MS with video composition capabilities may provide the composite view based on streams available on the network.

Newer end points capable of processing multiple video streams may be connected via a call with multiple video streams to the associated MS in such a way that they can receive several FV and/or SV streams. If these devices support IP multicast, they may also be able to connect to other advanced end points residing on the same network serviced by a single MS (via IP multicast) while also subscribing to speaker selection information distribution in order to get help in deciding which video streams to show at any point in time.

In operation of an example embodiment, end points 12 may join a video conference by calling or being directed to the video conference application. End point calls may go through the centralized call processing. Hence, communication system 10 can support skinny client control protocol (SCCP) and H.323, as well as SIP end points. H.323 end points can join a conference-button conference if they support H.323's empty capability set or if a media termination point (MTP) is used.

Each video-capable end point may transmit and receive all its audio and video streams to and from its locally assigned MS. Audio-only end points may transmit and receive their audio streams to and from the central audio bridge assigned to the conference. A policy director may also be provisioned to provide the policy to individual end points, specifying what type of end point video customization is allowed (e.g. number and types of windows). This may have a direct bearing on how much bandwidth reservation the end points may be allowed to request.

In order to protect any investment in traditional gateways (audio and video) or MCUs, the present architecture is flexible enough to be able to cooperate readily with a wide array of elements. Gateways may behave like H.323 end points that can support multiple calls. Traditional MCUs (e.g. Cisco IP/VC 35XX) can also act as special end points providing video composition services.

Media switches 26 (as abbreviated 'MS' herein in certain segments of this document) may be devices that provide a control interface to the conference manager. Each media switch 26 can perform a number of functions. Each media switch 26 can register its capabilities at startup, which can include any of the following media processing functions: 1) audio mixing that mixes audio of loudest speakers, distributes loudest speaker information to other MSs [Typically, an audio bridge also provides audio transcoding as part of the mixing in order to allow end points using different codecs to natively join the same conference without needing external transcoders.]; 2) audio transcoding that provides audio transcoding (codec translation) services that can be used by other network devices without necessary resources (e.g. DSPs) to perform audio transcoding on their own; 3) video composition that processes video by creating a composite view (i.e. Hollywood Squares scenario) of a set of participants [Typically, video composition can also provide video transrating and transcoding in order to allow end points using different rates or codecs to natively join the same conference without needing external transraters or transcoders.]; 4) video transrating that provides video transrating (bandwidth reduction by changing video quantization parameters) service that can be used by other network devices without necessary resources (e.g. DSPs) to perform video transrating on their own; 5) video transcoding that provides video transcoding (codec translation) services that can be used by other network devices without necessary resources (e.g. DSPs) to perform video transcoding on their own; 6) media switching that represents the interface between the edge of the network (toward end points) and the core of the network (toward other media switches.

The video distributing and suppressing function is referred to as the media switching function and this may be implemented in media switches 26 throughout the network or, alternatively, implemented in conjunction with video bridge 14 and audio bridge 16 without the need to implicate any media switch 26. The embodiment of FIG. 1A, inclusive of a potential active role for media switches 26, has been illustrated for purposes of providing one example only. Note also that while the subsequent operations and capabilities are described with reference to media switches 26, these functionalities may be readily performed by audio bridge 16 or video bridge 14 (or any combination thereof). Such capabilities have been described with reference to media switches 26 for teaching purposes only.

Additionally, existing network devices such as routers, switches, and wireless access points may provide the MS functionality because communication system 10 does not necessarily require a video digital signal processor (DSP). The MS functionality can be included as a software (in one example) feature in network operating systems such as Cisco IOS, Cisco CatOS, or in any other general-purpose operating system. End points 12 may connect to their nearest media switch 26 and send it their audio and video streams. To a given end point, media switch 26 may provide the MCU function, whereby the distributed nature of the conference is not visible to the end point. Thus, legacy H.323 end points can participate in a distributed conference with no changes required on the end point side. These end points can be referred as the local end points of the MS. Video streams can be distributed in a variety of ways. One architecture may use source-specific multicast (SSM), but communication system 10 allows generic multicast, unicast or multicast over unicast tunnels, or other suitable protocols to be used as the distribution mechanism.

Based on the services performed by an MS device, such applications may merit video processing DSPs, audio processing DSPs, or no DSPs at all. Combining several of the functions described above into a single network device allows the number of call legs involved in any media transmission to be reduced, which can avoid excessive delays in certain embodiments.

As part of the media switching function, MSs may be responsible for replicating packets in order to fan out unidirectional video streams so that all other MSs participating in the same conference can receive them. Any of the call legs (input or outputs) may use point-to-point or multicast call legs, allowing network infrastructures to take advantage of IP multicast at the core of the network if available (or allowing a reversion to a mesh of point-to-point calls in other scenarios). The edge transport mechanism is independent of the core transport mechanisms.

Figure 1B:
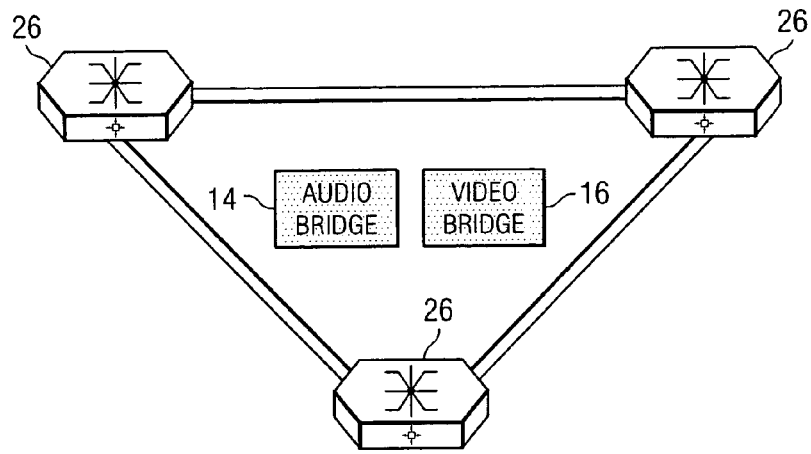
FIG. 1B is a simplified block diagram illustrating an example architecture associated with one or more media switches that are included in the communication system.

FIG. 1B is a simplified block diagram illustrating an example architecture associated with one or more media switches 26 that are included in communication system 10. A video bridge 14 and an audio bridge 16 may be provided as a service of one media switch 26 or multiple switches where appropriate. These elements may be included within one or more of media switches 26 or built as a single module to be included in the core of media switches 26 as illustrated by FIG. 1B. These two elements are illustrated in hatched boxes in order to signify the considerable flexibility that is available for their placement and positioning. For example, these elements may be part of a dedicated bridge or their own separate component, device, or module. Other applications may include these elements within a media switch 26 or a gateway 20 or in any other suitable location as described in more detail below. An endpoint may be deployed which contains video bridging functionality.

Each media switch 26 may include or be replaced by video bridge 14 and/or audio bridge 16 in accordance with one embodiment of the present invention. Alternatively, these two elements may be positioned in any suitable location or provided externally such that each of video bridge 14 and audio bridge 16 may be separate (potentially central) components, devices, or modules or combined where appropriate and based on particular needs. For example, audio bridge 16 and video bridge 14 may be provided in a router, a gateway, a switch, a loadbalancer, or in any other suitable location operable to facilitate their operations. In alternative embodiments, each media switch 26 may include any other suitable hardware, software, algorithms, processors, devices, components, objects, application specific integrated circuits (ASICs), or elements operable to facilitate the video-conferencing capabilities and operations thereof, as described herein in this document.

Each audio bridge 16 and video bridge 14 may be equipped with an audio mixer and video mixer respectively. Note that in certain instances in the industry, terms such as 'video mixer' and 'video bridge' denote the same meaning and are used interchangeably. However, a video mixer (as used herein in this document) is defined as being within the scope of the term 'video bridge 14.' The terms 'audio bridge' and 'audio mixer' can be interpreted similarly. In a particular embodiment of the present invention, each audio bridge 16 and video bridge 14 may include suitable software to provide the capabilities of distributed video conferencing or to execute the operations of communication system 10 as described herein. In other embodiments, these functionalities may be provided within a given network element (as described above) or performed by suitable hardware, algorithms, processors, devices, ASICs, components, objects, or elements. Note that any combination of these elements may also be used in given applications of video conferencing within communication system 10.

In operation of a particular detailed implementation, which is provided for example purposes only, a given end point may initiate a communication with multiple other end points. In this example scenario, three end points seek to connect to a video conference. A given media switch that is controlling those end points (for purposes of simplicity, it can be assumed that all of the end points may be registered at the same media switch) would connect each end point to a central audio bridge and a separate central video bridge.

The central audio bridge can identify the size of the appropriate jitter buffer for each end point and can send audio data to the jitter buffer. When all three end points have been connected and coupled to jitter buffers, the audio bridge can sum together the outputs of the jitter buffers and, thereby, create a single mixed audio stream with a unique output network time protocol (NTP) time stamp. The audio bridge can then determine the input-to-output mapping for each input audio stream: mapping the NTP time stamp of each input stream to the mixed output stream. The audio bridge can then send the mappings to a video mixer.

The video mixer can receive the streams and delay each stream such that the input-to-output mapping may be reproduced (and, at the same time, minimize the total delay by setting one of the delays to zero). Thus, the video mixer can decide which video stream is arriving the latest and delay all of the other streams appropriately such that the input-to-output matching of each individual video stream is matched to the input-to-output mapping of the corresponding audio stream. A mixed output video stream may then be created by mixing the delayed video streams. The outputs from the audio mixer and the video mixer can be sent back to the media switch and to each of the end points such that a synchronized video conference is facilitated.

Such an operation illustrates how synchronization can be achieved despite an audio mixer and video mixer existing on different devices. This is a result of the behavior of the audio and video mixer, whereby the audio mixer can measure the transformation and the video mixer can utilize the transformation data. The video mixer can skew the input streams so that the relative delays of the video mixer match the relative delays of the audio mixer. Communication system 10 also minimizes the total delay through the video mixer.

In the architecture of communication system 10, the video-capable end points may exchange signaling messages directly with the call agent (using H.323, SIP, SCCP+), but have their media streams directed to a local MS assigned to the end point location. Both the audio and video streams may be connected to the local MS without knowledge of where the network is actually routing or processing the media. This allows the core of the network to implement the video conferencing service in different ways without affecting the operation of end points 12.

Audio streams may be continuously propagated by media switches to the audio mixers for speaker selection based on energy levels. Audio distribution may use point-to-point bi-directional streams for all its connections, while the video distribution relies on uni-directional connections between the media switches.

PSTN 30 represents a worldwide telephone system that is operable to conduct or facilitate communications. PSTN 30 may be any land line telephone network operable to facilitate communications between two entities, such as two persons, a person and a computer, two computers, or PSTN 30 may be provisioned in any other environment in which data is exchanged for purposes of communication. PSTN 30 may operate in a wireless domain, facilitating data exchanges between multiple end points 12, or between other suitable entities within or external to communication system 10. PSTN may also be (or work in cooperation with) any local area network (LAN), metropolitan area network (MAN), wide area network (WAN), wireless local area network (WLAN), virtual private network (VPN), intranet, or any other appropriate architecture or system that facilitates communications in a network environment.

Figure 2A:
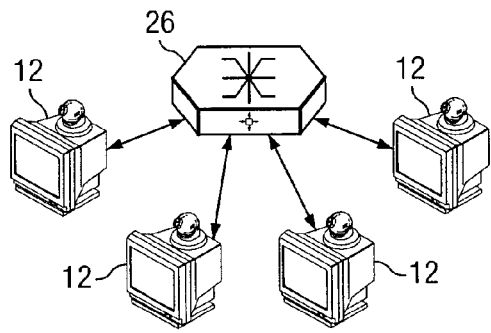
FIGS. 2A-C are simplified block diagrams that illustrate several video conferencing network topologies that have been deployed in previous architectures.
Figure 2B:
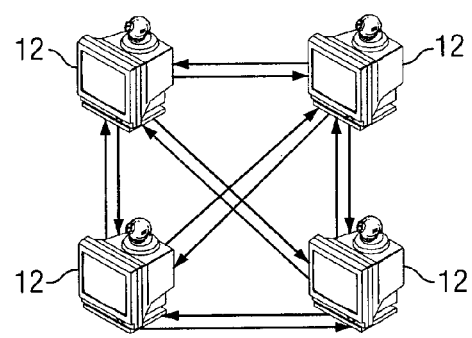
Figure 2C:
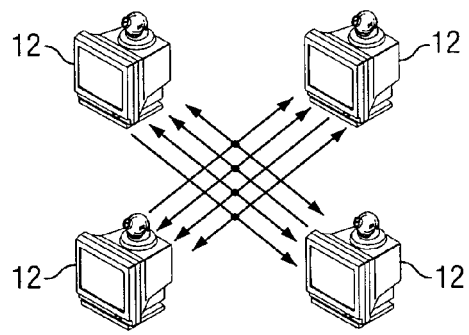

FIGS. 2A-2C are simplified block diagrams that illustrate several video conferencing network topologies that have been deployed in the past. FIGS. 2A-2C illustrate centralized unicast, distributed unicast, and distributed multicast architectures respectively. These architectures are offered for purposes of teaching only in providing a basis from which to illustrate some of the operations and capabilities of communication system 10. Accordingly, the corresponding discussion should not limit (in any way) the scope or range of principles or applications of communication system 10.

The traditional architectures of FIGS. 2A-2C have several disadvantages. For example significant bandwidth congestion is experienced in both distributed unicast and distributed multicast architectures. These two architectures may also be restricted from a legacy end point support standpoint. Additionally, scalability is limited in a centralized unicast system. A characteristic such as lip sync may be acceptable in some of these systems, but only while suffering from the aforementioned deficiencies.

The centralized unicast architecture of FIG. 2A is the most commonly used architecture. It provides design simplicity, but consumes excess bandwidth by replicating each stream to every end point. This limits its scalability for WAN deployments. The distributed unicast architecture of FIG. 2B may optimize the routing path used for individual media streams and therefore reduce network delays, but it suffers from excessive bandwidth consumption, as all end points typically receive all other streams regardless of these elements being needed or not, which not only restricts its scalability but also does not provide interoperability with legacy H.323 end points and gateways. Trying to reduce the bandwidth of each stream in order to compensate for the number of streams may reduce quality.

The distributed multicast architecture of FIG. 2C is similar to the distributed unicast architecture, having the added benefit of avoiding replication of identical streams. It, however, also relies on sending unnecessary streams to some end points, which results in excessive bandwidth and reduced scalability.

Communication system 10 may obviate these concerns by providing a distributed MCU network architecture capable of: 1) reducing WAN traffic by using intelligent video distribution and multicast, which, respectively, avoids transmitting streams that are not being viewed and eliminates duplication of streams that are being viewed; 2) minimizing video delays by minimizing video processing and optimizing its routing (similar to distributed video multicast implementations); 3) providing H.323 legacy end point support; 4) providing end point-independent lip sync (to compensate for independently routed audio and video streams); and 5) leveraging advanced network services (e.g. quality of service (QoS), SSM).

In addition to these characteristics, the teachings of communication system 10 allow for the ability: 1) to be agnostic to video codecs for basic services (allowing quick deployment of new video codecs); 2) to isolate network services upgrades and developments from end point developments; 3) to allow a range of new end points with more advanced services; and 4) to provide a framework for advanced services (video mail, recording, broadcasting, streaming, etc.).

Communication system 10 offers a smart network core capable of providing video conferencing services to both legacy as well as new advanced end points. Communication system 10 can also isolate complexities from the end points in order to allow for inter-operability with legacy terminals without precluding a set of new services available to new smart and flexible end points. Additionally, communication system 10 has a number of applications other than enterprise video conferencing, which are made possible with this architecture. For example, communication system 10 could be used in: 1) call center supervisor monitoring and conferencing; 2) distributed security cameras monitoring (e.g. police department applications that allow individual units to monitor any of a set of cameras distributed through town); 3) streaming into video conferences; and 4) video conference broadcasting.

The architecture of communication system 10 can fit into different call control models. For example, communication system 10 could be modeled in the centralized call processing environment. In such a model, the centralized call processing cluster provides call processing and call control services for the edge of the network while the conference manager application controls the streaming between MSs. This is accomplished by the conference manager application interacting with both the centralized call processing cluster (for call admission control, bandwidth reservation, MS registration and security services) and MSs (for network core media distribution and processing). In the context of a centralized call processing environment, the architecture may consist of multiple layers: a) the edge layer (where calls and media are established between the end points and the media devices); and b) the core layer (where the media generated by conference end points is distributed among the MSs to finally reach the end points interested in viewing the streams based on the media policies of the conference). Note that the core and edge layer embodiments also apply to the distributed model because of the application to the media processing layer and not the signaling layer. Media streams may also potentially be distributed and processed by intermediate MSs to accommodate different end point capabilities within one conference (e.g. video transrating, video transcoding, video composition).

Communication system 10 could also readily be applied to a purely SIP environment. In such an architecture, the conference manager application (representing the SIP focus service), signals directly with the SIP end points and the MSs (representing the SIP cascaded mixers).

Note that communication system 10 may be generally agnostic as to whether a conference is scheduled in advance (scheduled conferencing) or as to whether it is setup at the conference start time (ad-hoc conferencing). It is up to applications (e.g. centralized call processing conference button, centralized call processing MeetMe, scheduler, reservationless MeetMe, etc.) running at the highest level to present such services to the end-users, while interacting with the conference manager application in order to deliver them.

Figure 3:
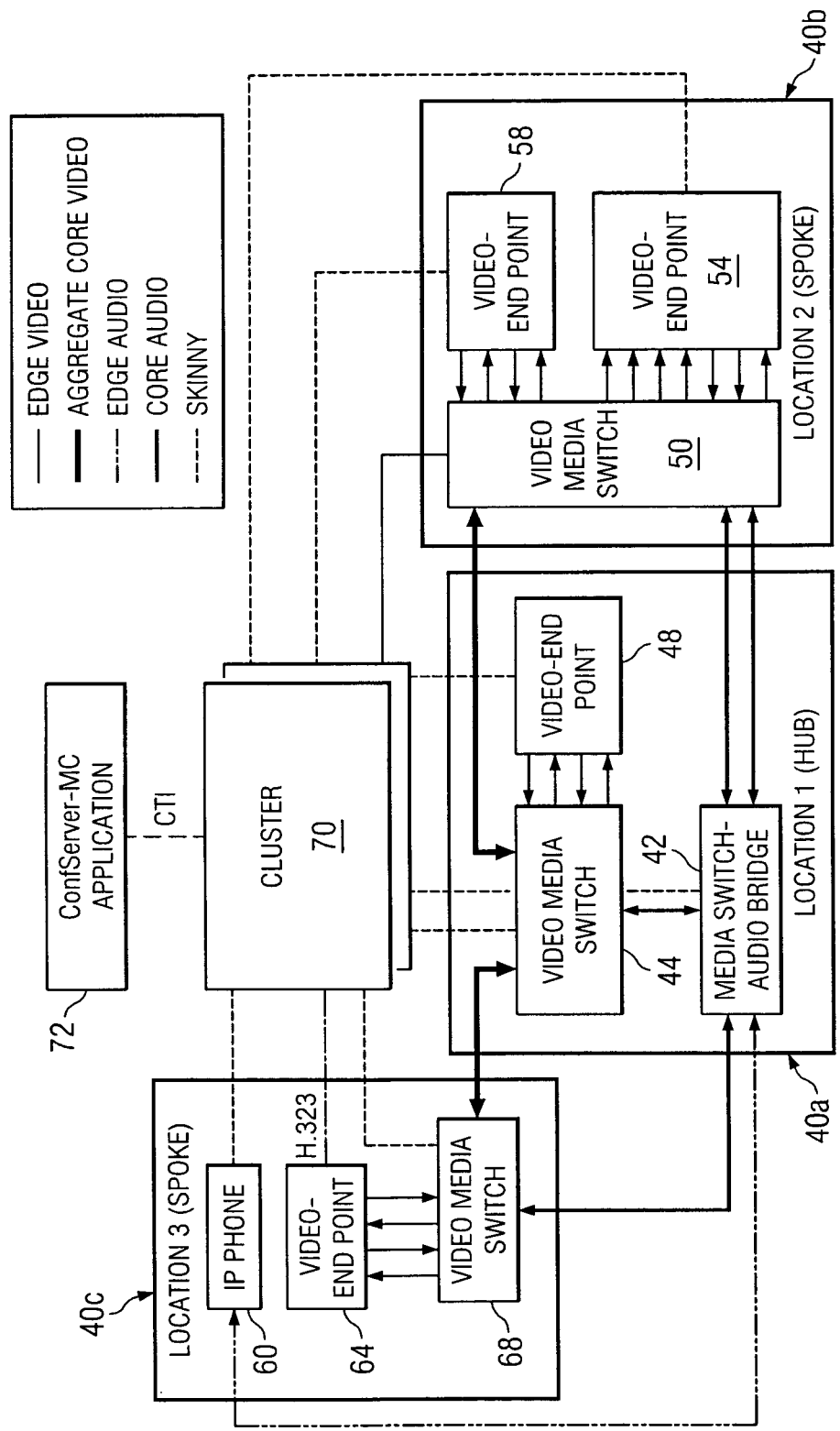
FIG. 3 is a simplified block diagram of an example component configuration operating in a call manager environment.

FIG. 3 is a simplified block diagram of an example centralized call processing application for communication system 10. Note that the embodiment of FIG. 3 offers one implementation, amongst many that can be readily accommodated in communication system 10. Other embodiments include distributed architectures that may be used to achieve the benefits provided by communication system 10. Such configurations are operational without the use of a call manager. When implemented in the centralized call processing environment, the locations within the centralized call processing may be leveraged to manage bandwidth reservations over low bandwidth links. Note that hub and spoke configurations among locations can be correctly supported by the centralized call processing locations concept. FIG. 3 includes a set of locations (or a hub and a set of spokes configuration) 40a-c that may be participating in a video-conferencing setup. Location 40a may include a media switch audio bridge 42 that is coupled to a video media switch 44. Video media switch 44 is operable to communicate with a centralized call processing cluster 70, as well as a peer video media switch 68 (as part of location 40c) and a video end point 48 included within location 40a.

Location 40b may include a video media switch 50 that is operable to communicate aggregate core video data to video media switch 44. Video media switch 50 may also communicate core audio data to media switch audio bridge 42. Video media switch 50 may also exchange information or data with a set of video end points 54 and 58, which may be included within location 40b. These three components (video media switch 50 and video end points 54 and 58) may be operable to communicate with centralized call processing cluster 70. Note that other suitable communications with the configuration of FIG. 3 are also possible as indicated by connecting segments within the illustration. Note also that a key has been provided to offer some example types of data that may be exchanged in the system, however other types of data (or any suitable combinations) may also be readily accommodated.

Location 40c may include an IP phone 60 (used in this example scenario), a video end point 64, and a video media switch 68. IP phone 60 may communicate with centralized call processing cluster 70 as well as media switch audio bridge 42. Note the H.323 link that couples video end point 64 and centralized call processing cluster 70. (H.323 is a standard approved by the International Telecommunication Union (ITU) to promote compatibility in videoconference transmissions over IP networks. H.323 is considered to be the standard for interoperability in audio, video, and data transmissions as well as Internet phone and voice-over-IP (VoIP) because it addresses call control and management for both point-to-point and multipoint conferences as well as gateway administration of media traffic, bandwidth and user participation. H.323, which describes how multimedia communications occur between terminals, network equipment, and services, is part of a larger group of ITU recommendations for multi-media interoperability called H.3x.)

In a centralized call processing environment, the centralized call processing can handle call routing, call setup, and media setup at the edge layer between end points and the system application. For edge calls, call signaling may be terminated by the system application while media may be terminated at the video MS for video-capable end points and at the MS audio bridge for audio-only end points. For the core layer, the centralized call processing may be (at a minimum) the BW manager as well as a gateway between the application and the media devices (CTI to skinny gateway).

The conference manager application acts as the controller and the rendezvous point for system conferences. In H.323 terms, this application behaves as a multipoint controller (MC). It has the following functions: 1) terminates all calls from/to end points (edge layer) [Note that the actual call flow to create and join a conference depends on the type of conference being created.]; 2) allocates ad hoc conference resources such as video MSs and audio bridge MSs. [Scheduled resources may be allocated by the scheduling application.]; 3) controls the media policy of the conference [Media policy determines who can see and hear what occurs within the conference.]; 4) manages bandwidth (in conjunction with the centralized call processing) in the core layer; and 5) controls the core part of the media resources (video MSs and audio bridge MSs) using CTI.

In operation of one example operation involving a scheduled conference, the scheduled conference is setup by a user using a web interface. A conference ID is assigned to the conference. When scheduling the conference, the user could specify date/time, the number of users in the conference, and from where they would be calling. centralized call processing location information may be provided to the user. This information could be used for checking the system conference bridge resources and the bandwidth resources in the locations. The user could also say what may be the video codec used for this conference.

In operation of yet another example embodiment involving a "reservation-less meet-me conference" such a scenario is similar to the scheduled conferences. The conference may be created using the web interface. In the case of a reservation-less meeting, the conference may be created when a user joins the conference rather than when it is scheduled. 'MeetMe button' conferences may be effectuated in the following manner. A first participant presses a 'MeetMe' button on the phone and dials the MeetMe number. The MeetMe conference is created and the user joins the conference. Other participants can dial the MeetMe number directly to join the MeetMe button conference.

In operation of still another example operation involving conference button conferences, in order to add a third participant to a two-party call, one of the two-party call (conference initiator) participants presses the conference button and then dials the third party. Once the third party answers the conference the initiator presses the conference button. Now, all three participants may be in a conference. If a fourth party needs to be added then the conference initiator may do the same sequence of operations to add the fourth participant.

Speaker selection information may be distributed to all MSs, even the ones that do not have an audio processing capability. This information can be updated in real-time and used by all MSs to filter video for DM call legs.

Edge call routing addresses how media call legs may be setup between the end points and their associated MSs. Audio streams for non-video-capable devices may be setup directly between the end point (e.g. phone, gateway, etc.) and the audio media processor for audio mixing. However, for video-capable devices, an intermediate MS (belonging to the same region as the end point) can be introduced in order to provide more elaborate audio and video services (e.g. lip sync, video routing, intelligent video distribution, etc.).

DM video streams may share egress call legs. From the end point perspective, there is a single connection over which video streams from multiple end points take turns based on the selected policy (e.g. speaker selection information). Since the egress call leg is a separate call leg, its timestamp information is generated by the egress MS, and does not directly correspond to the incoming streams' timestamps.

Due to the central mixing of audio, a need for an audio transcoder is determined by knowing the capabilities, locations, and regions of the calling end point and the MS audio bridge. All of this information is known at the beginning of the call and is static for the lifetime of the conference. Hence, an audio transcoder can either be implicit within the MS audio bridge or can be automatically inserted by centralized call processing as part of the edge call. An audio transcoder can be inserted by centralized call processing in the edge call between the IP phone and the MS audio bridge.

One difference, from an audio point of view, between an audio only end point and a video end point is where the media for the edge call is terminated. In the first case, the audio is terminated on the audio bridge and, hence, centralized call processing has all information needed to correctly set up the audio transcoder. In the second case the audio is terminated on the edge video MS and then distributed by the application to the MS audio bridge. Thus, in order for the centralized call processing to correctly setup an audio transcoder, the edge MS video has to report the audio capabilities, location, and region information of the audio bridge for the audio part (and those of the video MS for the video part). The video MS can look like two devices for the centralized call processing and the centralized call processing could be able to maintain two different media paths per call: one for audio and one for video. Another alternative is to allow audio streams to go directly to the MS audio bridge.

A caller can also join a video conference using an extensible mark-up language (XML) application. The user could enter the conference ID in the XML application. The application gets the hostname and the conference ID. Using the hostname, a database lookup is made to get the media resource group list (MRGL) of the phone. If there are enough resources, the application gets a participant ID and sends the dialed number to the XML application. The dialed number may contain a conference ID and participant ID.

Using the web entry or the interactive voice response (IVR) entry, the call may come to the conferencing route point. When the call comes, the MRGL of the phone is already known to the application. The application can choose the MS from the MRGL and allocate a MS video port and a MS audio port for the call. The application requests the ACB (Application Controlled Bridge) to terminate the call at the MS video port and passes the MS video capabilities to the ACB. The video capabilities may depend on what the conference creator specified during the conference creation. The application informs the MS about the call and about the audio port allocated to the participant. The application also informs the MS audio bridge about the call. The video switching MS may receive the audio and pass the stream to the audio bridge MS.

If the caller does not support video (the new call event to the application may have the information about whether the end point supports video or not), an audio bridge MS port may be allocated and the application may terminate the call at that port. For a scenario involving a reservation-less 'Meet Me' conference, such a case is similar to the scheduled conferences. The conference is created using the web interface and the conference may be created when a user joins the conference rather than when it is scheduled. The IVR may be similar to the scheduled conference and the call flows may be similar to the scheduled conference.

End points 12 may use the conference softkey for conference button audio conferencing. The device capabilities (and the MRGL) of the initiating end point may be used to determine the type of bridge used for the conference (video switching function for video-capable end points and audio bridge otherwise). When the conference softkey is pressed, the conference feature queries the bridge control for an available conference port. The bridge control queries the ordered list of bridges in the MRGL for a free conference port. If a port is available the bridge returns a DN. The conference feature redirects the call to this DN.

A similar approach can be used to schedule an ad hoc video conference. When the conferencing softkey is pressed, the conferencing feature queries the ordered list of MSs for a free conference port. The MS in turn queries the present architecture application for an available port. If resources may be available the application returns the DN of the route point with a conference ID. The call is redirected to the route point DN and the application gets a chance to set up the conference.

Different mechanisms can be used for media distribution in the core. Audio streams coming from video-enabled end points can be distributed from the edge video MS to the audio bridge MS allocated for the conference. Mixed audio streams can be distributed from the audio bridge MS to the edge video MS connected to video-enabled end points. Audio streams coming from audio-only devices may be handled in the edge layer and not in the core layer, as they can be directly transmitted to the audio bridge.

RTP/user datagram protocol (UDP)/IP unicast streams may be used to achieve audio distribution. The number of audio connections/streams between an edge video MS and the audio bridge MS equals the number of video-enabled end points transmitting audio (and connected to that edge MS). Similarly, the number of audio connections/streams between the audio bridge MS and the edge video MS equals the number of video-enabled end points receiving audio (and connected to that edge MS).

Audio transcoding for audio-only end points may be handled in the edge layer by the centralized call processing. For video end points, the application may insert the necessary audio transcoders between the video edge MS and the audio bridge MS. The following may be examples of factors that might be used by an application to determine if and where a transcoder is needed: if both the calling end point and the audio bridge MS are in the same location and there is no common audio codec supported by both devices that satisfies the inter-Region requirements, then a transcoder may be inserted between the two devices.

In a voice-activated conference, all participants see the current speaker except for the current speaker who continues to see the last speaker. This means that the last speaker continues sending its video stream just to a single end point (the current speaker). In order to avoid having two streams multicasted throughout the network, which would require excessive bandwidth reservations, the last speaker can send its stream only to the current speaker. The last speaker's stream can follow the multicast path to its destination in order to preclude the need for further bandwidth reservations. The last speaker can send its DM video stream as a unicast stream following the same path the preceding multicast stream followed. Since only a single unicast stream representing the last speaker may be necessary per conference, a single RTP UDP port can be reserved per media switch per conference, which may be the port to which the last speaker's video is unicasted.

Each call leg in the network can use a different transport protocol without affecting the rest of the network or other call legs carrying the same stream. By isolating the core of the network from the end points, changes in the interior transport mechanism may not affect the communication between the edge MS and the end point.

In order to take advantage of network bandwidth in the LAN, end points with IP multicast capability can stream video to each other without introducing an additional call leg through the local MS. In order to enable the IP multicast end points to communicate with other participants in the network, the local MS can be IP multicast-enabled in order to forward LAN video traffic over the network infrastructure (and also to multicast remote video streams over the local LAN). Note that any local MS could export speaker selection information to the multicast end points to help them select among the multiple LAN multicast streams.

The video fast update and flow control messages may be carried by standard mechanisms (H.245 and SCCP) over the edge call legs (from end point to MS). Since neither centralized call processing nor conferencing application have any real time knowledge of the video sources being switched in the core of the network, the relaying of real-time control messages can bypass the call control elements and flow directly between the MSs.

A UDP control port can be opened at the MSs in order to allow for this control communication. The same control port can be used for fast updates, flow control, FECC (Far End Camera Control) and any other inter-MS real-time control protocol needed, assuming the control protocol is able to carry multiple higher layer protocols. In case of a centralized call processing fail-over, fast update and flow control may cease to function since these signals may be transported over centralized call processing for the edge call leg. For new video end points, which use an RTP based mechanism to transport these signals, the services may be still available after the fail-over.

Because such an architecture results in the source stream being received by multiple receivers, the use of flow control messages may not be desirable since a single receiver may affect the image seen by all other conference participants. Therefore, the architecture may still allow this mechanism to be used, but a policy selection option could be provided to the system administrator to disable its use.

In the context of an FECC message flow at the edge of the network (between end points and MSs), FECC messages flow over an H.224 RTP stream using a standard proprietary format connection. This single control channel may be used to control all RTP video streams belonging to the same call (the local stream ID is used to select the video stream). The H.224 channel setup is part of the initial call setup message.

In the core of the network (between MSs), a single UDP control port is open on each MS, and this control port can be shared for control of all end points associated with this MS. This control port is setup in conjunction with the creation of the first SSM multicast call leg.

For an FM video stream, the mapping between the core video call leg (call to video originating MS) and the edge call leg (call to the video receiving end point) is static and easily identified. For a DM video stream, the mapping depends on the currently active stream, which is known by the video receiving MS. The FECC messages (initial and subsequent, even if the video source selection policy indicates a change) may be routed to the current video originating MS.

If the MS FECC UDP control port is dynamically assigned, an MS (unicast IP address) to FECC UDP control port mapping table can be maintained in each MS. This can be downloaded from the central conferencing application responsible for setting up the core call legs. In order to minimize the number of interactions with a central application and accelerate the FECC initial communication, the end point capabilities can be cached in the MS close to the end point.

As an end point joins a conference, the sequence of events in one example operational flow (as it relates to FECC) is as follows:

1. When a client joins the conference, the edge call leg is established between the end point and the assigned MS, including the FECC channel and port numbers;
2. The associated MS joins the conference and the MS UDP FECC control port is setup;
3. The conferencing application updates the mapping table in all MSs within the same conference for the new joining MS;
4. The MS may retrieve the camera capability and cache/store it for later use;
5. The user at a remote end point invokes the FECC feature via its H.323 annex Q/H.242 edge connection;
6. The remote MS retrieves the camera capability from the MS associated to the controlled end point via the FECC protocol between MSs;
7. Both MSs then pass (with possible message translation (ISDN/H.323.Q)) the FECC commands; and
8. For a voice-activated conference, the participant invoking the FECC for a remote camera can continue seeing the selected participant regardless of other video streams being activated due to new speakers being selected. To avoid affecting the ongoing conference, a separate unicast stream can be sent to the participant invoking the FECC functions. This mechanism is similar to the last speaker unicast video streaming functionality.

With this architecture, video processing is reduced to a minimal level. If no video transrating is needed and all end points share the same codec, no media processing needs to be performed by the infrastructure. As long as the call setup capabilities can be exchanged between end points, the fact that any type of video codec is being used does not impact the network processing other than the associated bandwidth implications and the need to identify the I-Frame when switching video sources. The implementation of a video source switching time-out, which ensures that if an I-Frame is not found in a given amount of time (e.g. two seconds) ensures that the operation remains reliable under packet drop conditions and situations where a new video codec is used).

New smart end points may be capable of receiving multiple streams and selecting and showing a subset of them. By performing this function in the end point, the user can customize what he sees. In a version of a PC-based software end point, the end user may be able to setup any number of video windows and specify what is to be seen in each of them. Options include: 1) current speaker, 2) last speaker, 3) previous to last speaker, and 4) specific participant. Integrating conference participant directory services may allow the end user to select any participant for viewing in windows showing a single user or location.

For legacy end points, however, the network can provide the composition service. This can be accomplished by a centralized MS with video composition capabilities, by a distributed MS architecture, or by a traditional MCU operating as an end point. For the centralized MS implementation, the call processing services may connect all the relevant streams to the video composition MS (DM streams for VAS windows and FM for specific participants), which may then create a new video representation available as a separate video stream to any end points needing it throughout the network. This video composition MS may also subscribe to the speaker selection distribution service in order to determine the right video stream to mix at any point in time.

For the distributed MS implementation, each participating MS may need to have video DSPs. The central application could coordinate the composite view by instructing each participating MS to create a single sub-window of the composite view. For DM streams, a single MS could subscribe to all DM streams in order to create a new stream with the multiplexed participants. For FM streams, the ingress MS associated to the viewed participant could be a good candidate to generate the sub-window close to the origin. The egress MSs could then subscribe to each of the interested windows and mix/map their video streams into the egress call leg. The end point could then have a continuous stream, with each video packet updating just a given portion of the composite view, but without having to be aware of it.

For a model where a traditional MCU operates as an end point, the conference manager application may create a new media stream in the core of the network, which may be one of the video streams coming from the H.323 MCU (all video streams should look the same), while the remaining video streams and all audio streams may be dropped by the MS. All end points wishing to see a video composite may receive the newly available video composite as an FM stream.

Video transcoding and transrating may differ from the audio mixing and video composition in that they only handle a single input stream. Since the present architecture introduces the concept of a dynamic mapping (DM) stream that is typically inactive, an optimization is desirable in order to minimize the use of transcoding/transrating resources in the network. For this reason, a transcoder/transrater could support the case where multiple streams can be connected to a single transcoding/transrating DSP channel, which would minimize DSP processing power consumption.

These transcoding/transrating services can be provided by: 1) an MS providing a transcoder/transrater service for another MS, which does not have transcoding/transrating capabilities, 2) an embedded transcoder/transrater as part of an MS switching/mapping service (this avoids a dedicated call leg for this service), or 3) a traditional H.323 video device (MCU or transrater/transcoder) acting as a special end point.

In order for a traditional H.323 video device to operate as transrating/transcoding end point, the present architecture conference manager can be aware that there may be special end points providing these video services. In order for traditional MCUs to provide transrating/transcoding services, a two-party conference can be setup. For an H.323 device operating as a dedicated (single stream) transcoder/transrater, a single connection, DM, or FM can be setup between the associated MS and the end point.

The present architecture may provide lip sync services to both RTCP and non-RTCP enabled end points. When providing lip sync for non-RTCP end points, the core of the network (connections and services between ingress and egress MSs) is to ensure that related packets that arrive together at the ingress MS also leave the egress MS at the same time. For RTCP-capable end points, RTCP may be used on the edge connection between end point and MS, or be carried throughout the core.

In order to allow a clean video image transition between different sources, the switching may take place at an I-Frame boundary. The fact that I-Frames may be typically significantly larger than intermediate P-Frames, (and that end points normally shape their bit-rate transmission to conform to a given maximum limit), results in the transmission of the I-Frames taking significantly longer and causing the frame rate to momentarily drop. The end-user may notice a freeze for video streams with any high degree of movement, just prior to the new video source being displayed. This is common in existing centralized MCUs as well.

In order to avoid this freeze prior to video source switching, IP communication systems can be used, which allow bursty traffic. If the ingress MS buffers all the I-Frame IP packets until the last fragment is received, it can delay the previous stream shutting off notification until that time and then burst all the I-Frame IP packets in order to maintain a smooth frame rate at the cost of a network bandwidth spike. In order to minimize the probability of these important I-Frame packets being dropped by bandwidth policing agents, the DSCP priority could be raised for those packets.

Due to the distributed nature of the video switching in the present architecture, and due to the fact that the location from where participants may be calling may not be known ahead of time, reserving resources for future conferences may not be as simple as the resource reservation for centralized conferences. The following elements may be present in the present architecture and be considered for reservation purposes: 1) audio mixer; 2) audio transcoders; 3) video mixers; 4) video processors (transraters/transcoders); 5) audio/video gateways; 6) MS video switching capacity; and 7) WAN bandwidth. Unless the location of the potential callers and video mixers is known ahead of time, the only resource easily scheduled is the centralized audio mixer.

Figure 4:
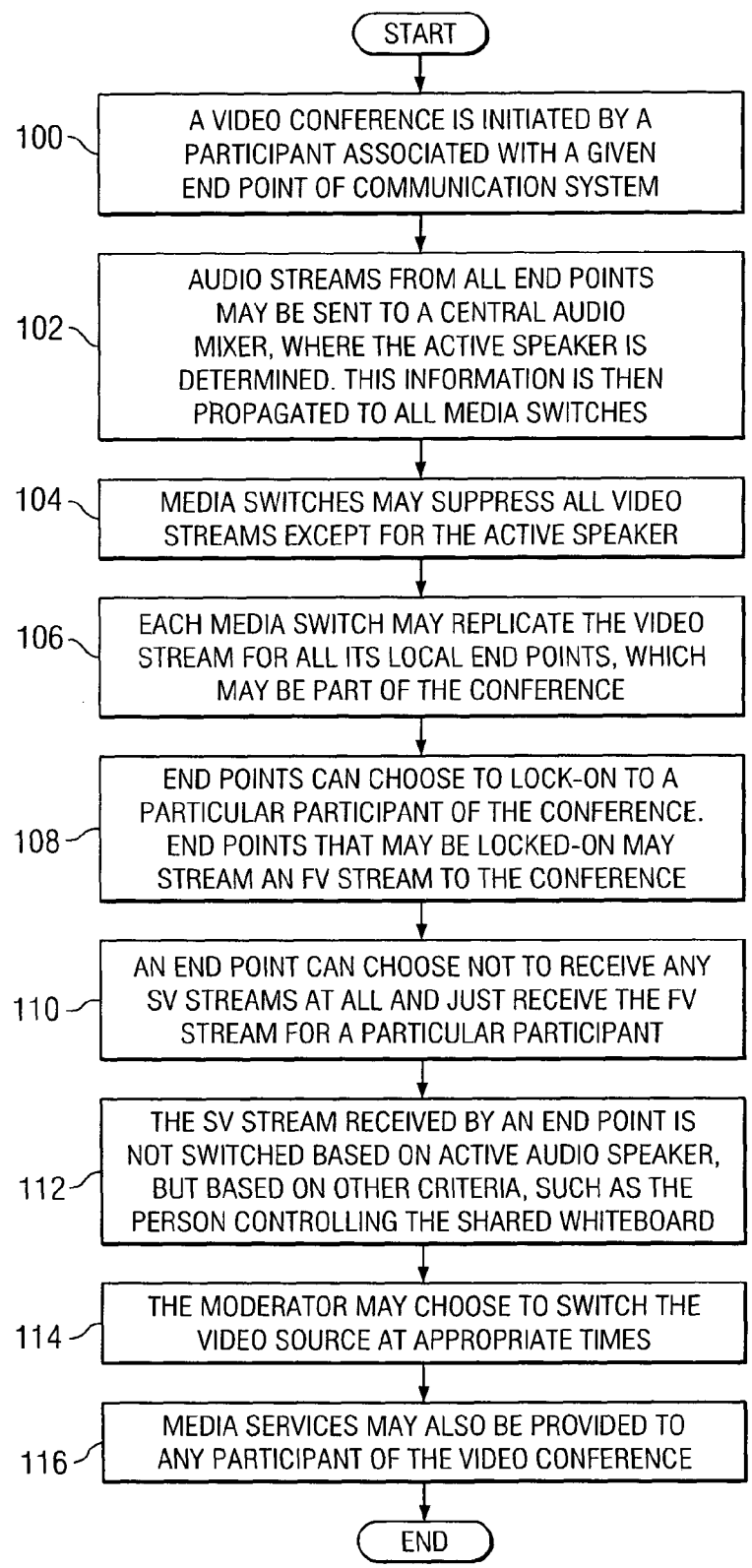
FIG. 4 is a flowchart illustrating a series of example steps associated with a method for performing distributed video conferencing in accordance with one embodiment of the present invention.

FIG. 4 is a simplified flowchart illustrating a series of example steps associated with executing distributed video conferencing. The flowchart may begin at step 100 where a video conference is initiated by a participant associated with a given end point of communication system 10. At step 102, the audio streams from all end points 12 (both audio-only and video-capable) may be sent to a central audio mixer, where the active speaker is determined. This information is then propagated to all media switches 26.

At step 104, media switches 26 may suppress all video streams except for the active speaker and the video stream for the active speaker may be propagated to all the MSs in the conference (e.g. using SSM). At step 106, each media switch 26 replicates the video stream for all its local end points, which may be part of the conference. In other scenarios, multicast protocols can be used between media switch 26 and its local end points. The audio mixing can be centralized or distributed within communication system 10. At step 108, end points 12 can choose to lock-on to a particular participant of the conference. This capability may be provided through a separate interface or it may be part of the end point functionality at enhanced end points. End points 12 that may be locked-on may stream an FV stream to the conference. This functionality could be implemented in media switch 26. Where multiple end points desire to lock-on to the same participant, media switches 26 can subscribe to the same SSM stream, or signaling can be exchanged between media switches 26 to set up appropriate unicast streams. Thus, each end point 12 can receive a mixture of FV and SV streams.

Step 110 reflects the ability of an end point to opt not to receive any SV streams at all and just receive the FV stream for a particular participant (e.g. a lecture mode with a question and answer session, where an end point may choose to receive only the keynote speaker and hear the audio for the questions). Step 112 is provided to illustrate the flexibility involved in switching the SV streams. The SV stream received by an end point may not necessarily be based on the active audio speaker, but based on other criteria, such as the person controlling a shared whiteboard. Alternatively, the moderator may choose to switch the video source at appropriate times, as reflected by step 114. There may be multiple SV streams in a single conference and different criteria may be used for switching the source. An end point can choose to receive one, multiple, or none of the SV streams in the conference.

Step 116 represents the ability of one communication system 10 to provide one or more media services to a participant of the video conference. Thus, communication system 10 may be provided with media transformers (e.g. transcoders, transraters, and composition services) to provide the relevant media services.

Some of the steps illustrated in FIG. 4 may be changed or deleted where appropriate and additional steps may also be added to the flowchart. These changes may be based on specific communication architectures or particular interfacing arrangements and configurations of associated elements and do not depart from the scope or the teachings of the present invention. It is important to recognize that FIG. 4 illustrates just one of a myriad of potential implementations of communication system 10.

Although the present invention has been described in detail with reference to video-conferencing communications, communication system 10 may be used for any protocol involving routing, mapping, or redirection of streaming information in any communications environment. Any suitable communications that involve two or more participating entities may benefit from the teachings of the present invention. The use of video-conferencing communications has only been offered for purposes of teaching and should not be construed to limit the scope of the present invention in any way.

Moreover, although the present invention has been described with reference to a number of elements included within communication system 10, these elements may be rearranged or positioned in any appropriate manner to accommodate any suitable routing configurations. In addition, any of these elements may be provided as separate external components to communication system 10 or to each other where appropriate. For example, either video bridge 14 or audio bridge 16 may be provided within or external to media switch 26 in a single module or component that is operable to execute the operations of distributed video conferencing as identified herein. The present invention contemplates great flexibility in the arrangement of these elements as well as their internal components.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" may be specifically used in the particular claims; and (b) does not intend, by any statement in the specification, to limit this invention in any way that is not otherwise reflected in the appended claims.

What is claimed is:

1. An apparatus for executing a video conference, comprising:
an audio mixer residing in a network and capable of determining the active speaker associated with one end point of one or more end points, the audio mixer being able to create a mixed audio stream that may be communicated to the one or more end points such that the one or more end points do not have to perform audio mixing, the mixed audio stream is a mix of input audio streams from the one or more end points, and the audio mixer being able to determine an input-to-output mapping for each input audio stream, the input-to-output mapping indicating the delay of the input audio stream to the communicated mixed audio stream; and
one or more media switches operable to receive information associated with the active speaker, the input-to-output mapping for the audio stream associated with the active speaker, and one or more video streams associated with the video conference, wherein at least one media switch of the one or more media switches is operable to suppress the one or more video streams except for a selected video stream associated with the active speaker and delay the selected video according to the input-to-output mapping such that the selected video stream corresponds to the audio stream of the active speaker, the selected video stream propagating to the one or more media switches during the video conference without audio, and wherein a selected media switch of the one or more media switches is operable to replicate the selected video stream such that it may be communicated to one or more end points associated with the selected media switch.

2. The apparatus of claim 1, wherein the selected video stream propagates to one or more of the media switches during the video conference using a multicast protocol.

3. The apparatus of claim 1, wherein a selected one of a multicast and a unicast operation is performed between the selected media switch and the end points associated with the selected media switch.

4. The apparatus of claim 1, wherein a selected media switch is operable to enable a selected one of the end points associated with the video conference to lock-on to a participant of the video conference, the selected end point propagating a fixed video (FV) stream associated with the video conference.

5. The apparatus of claim 1, wherein a selected media switch is operable to control whether a selected one of the end points receives an FV stream, a switched video (SV) stream, or any combination thereof.

6. The apparatus of claim 1, wherein a selected one of the end points does not receive an SV stream based on the active speaker, and wherein the selected one of the media switches is operable to enable a selected one of the end points to receive the SV stream based on a selected whiteboard control feature.

7. The apparatus of claim 1, wherein a selected one of the media switches is operable to enable a moderator of the video conference to control a video source such that a selected one of the end points receives a selected video stream as determined by the moderator.

8. The apparatus of claim 1, further comprising:
a media bridge operable to provide one or more media services for the video conference such that one or more of the media services are delivered to one or more of the end points.

9. The apparatus of claim 8, wherein the media bridge includes a selected one or more of a media transformer, a transcoder, and a transrater.

10. The apparatus of claim 1, further comprising:
a gateway operable to provide connectivity to one or more media switches, one or more of the media switches being operable to facilitate participation in the video conference by the first and second end points.

11. A method for executing a video conference, comprising:
receiving, from an audio mixer, information associated with an active speaker, the audio mixer residing in a network and capable of determining the active speaker associated with one end point of one or more end points, and the audio mixer being able to create a mixed audio stream that may be communicated to the one or more end points such that the one or more end points do not have to perform audio mixing, the mixed audio stream is a mix of input audio streams from the one or more end points, and the audio mixer being able to determine an input-to-output mapping for each input audio stream, the input-to-output mapping indicating the delay of the input audio stream to the communicated mixed audio stream;
receiving one or more video streams associated with the video conference and the input-to-output mapping for the audio stream associated with the active speaker from the one or more end points;
suppressing the one or more video streams except for a selected video stream associated with the active speaker;
delaying the selected video according to the input-to-put-out mapping such that the selected video stream corresponds to the audio stream of the active speaker;
propagating the selected video stream to one or more media switches during the video conference without audio; and
replicating the selected video stream such that it may be communicated to one or more end points associated with a selected media switch of the one or more media switches.

12. The method of claim 11, wherein the selected video stream propagates to one or more of the media switches during the video conference using a multicast protocol.

13. The method of claim 11, further comprising:
performing a selected one of a multicast and a unicast operation between the selected media switch and the end points associated with the selected media switch.

14. The method of claim 11, further comprising:
enabling a selected one of the end points associated with the video conference to lock-on to a participant of the video conference, the selected end point propagating a fixed video (FV) stream associated with the video conference.

15. The method of claim 11, further comprising:
controlling whether a selected one of the end points receives an FV stream, a switched video (SY) stream, or any combination thereof.

16. The method of claim 11, wherein a selected one of the end points does not receive an SV stream based on the active speaker, and wherein the selected media switch is operable to enable a selected one of the end points to receive the SV stream based on a selected one of a whiteboard control feature and a bandwidth parameter.

17. The method of claim 11, further comprising:
enabling a moderator of the video conference to control a video source such that a selected one or more of the end points receives a selected video stream as determined by the moderator.

18. The method of claim 11, further comprising:
providing one or more media services to the video conference such that one or more of the media services are delivered to one or more of the end points.

19. A system for executing a video conference, comprising:
means for receiving information associated with an active speaker, wherein the system includes an audio mixer that resides in a network and is capable of determining the active speaker associated with one end point of one or more end points, and the audio mixer being able to create a mixed audio stream that may be communicated to the one or more end points such that the one or more end points do not have to perform audio mixing, the mixed audio stream is a mix of input audio streams from the one or more end points, and the audio mixer being able to determine an input-to-output mapping for each input audio stream, the input-to-output mapping indicating the delay of the input audio stream to the communicated mixed audio stream;
means for receiving one or more video streams associated with the video conference and the input-to-output mapping for the audio stream associated with the active speaker from the one or more end points;
means for suppressing the one or more video streams except for a selected video stream associated with the active speaker;
means for delaying the selected video according the input-to-output mapping such that the selected video stream corresponds to the selected audio stream of the active speaker;
means for propagating the selected video stream to one or more media switches during the video conference without audio; and
means for replicating the selected video stream such that it may be communicated to one or more end points associated with a selected media switch of the one or more media switches.

20. The system of claim 19, wherein the selected video stream propagates to one or more of the media switches during the video conference using a multicast protocol.

21. The system of claim 19, further comprising:
means for performing a selected one of a unicast and a multicast operation between the selected media switch and the end points associated with the selected media switch.

22. The system of claim 19, further comprising:
means for enabling a selected one of the end points associated with the video conference to lock-on to a participant of the video conference, the selected end point propagating a fixed video (FV) stream associated with the video conference.

23. The system of claim 19, further comprising:
means for controlling whether a selected one of the end points receives an FV stream, a switched video (SV) stream, or any combination thereof.

24. The system of claim 19, wherein a selected one of the end points does not receive an SV stream based on the active speaker, and wherein the selected media switch is operable to enable a selected one of the end points to receive the SV stream based on a selected whiteboard control feature.

25. The system of claim 19, further comprising:
means for enabling a moderator of the video conference to control a video source such that a selected one or more of the end points receives a selected video stream as determined by the moderator.

26. The system of claim 19, further comprising:
means for providing one or more media services to the video conference such that one or more of the media services are delivered to one or more of the end points.

27. Software for executing a video conference, the software being embodied in a non-transitory computer readable medium and comprising computer code such that when executed by one or more processors is operable to:
receive, from an audio mixer, information associated with an active speaker, the audio mixer residing in a network and capable of determining the active speaker with one end point of one or more end points, and the audio mixer being able to create a mixed audio stream that may he communicated to the one or more end points such that the one or more end points do not have to perform audio mixing, the mixed audio stream is a mix of input audio streams from the one or more end points, and the audio mixer being able to determine an input-to-output mapping for each input audio stream, the input-to-output mapping indicating the delay of the input audio stream to the communicated mixed audio stream;
receive one or more video streams associated with the video conference and the input-to-output mapping for the audio stream associated with the active speaker from the one or more end points;
suppress the one or more video streams except for a selected video stream associated with the active speaker;
delaying the selected video according to the input-to-put-out mapping such that the selected video stream corresponds to the audio stream of the active speaker;
propagate the selected video stream to one or more media switches during the video conference without audio; and
replicate the selected video stream such that it may he communicated to one or more end points associated with a selected media switch of the one or more media switches.

28. The medium of claim 27, wherein the selected video stream propagates to one or more of the media switches during the video conference using a multicast protocol.

29. The medium of claim 27, wherein the code is further operable, to:
perform a selected one of a unicast and a multicast operation between the selected media switch and the end points associated with the selected media switch.

30. The medium of claim 27, wherein the code is further operable to:
enable a selected one of the end points associated with the video conference to lock-on to a participant of the video conference, the selected end point propagating a fixed video (FV) stream associated with the video conference.

31. The medium of claim 27, wherein the code is further operable to:
control whether a selected one of the end points receives an FIV stream, a switched video (SV) stream, or any combination thereof.

32. The medium of claim 27, wherein a selected one of the end points does not receive an SV stream based on the active speaker, and wherein the selected media switch is operable to enable a selected one of the end points to receive the SV stream based on a selected whiteboard control feature.

33. The medium of claim 27, wherein the code is further operable to:
 enable a moderator of the video conference to control a video source such that a selected one or more of the end points receives a selected video stream as determined by the moderator.

34. The medium of claim 27, wherein the code is further operable to:
 provide one or more media services to the video conference such that one or more of the media services are delivered to one or more of the end points.

* * * * *